April 17, 1962 F. A. SAAL 3,030,447

SPEECH INTERPOLATION SYSTEM

Filed Jan. 27, 1960 2 Sheets-Sheet 1

INVENTOR
F. A. SAAL
BY R. O. Nimz
ATTORNEY

April 17, 1962 F. A. SAAL 3,030,447

SPEECH INTERPOLATION SYSTEM

Filed Jan. 27, 1960 2 Sheets-Sheet 2

INVENTOR
F. A. SAAL

BY R. O. Nimtz

ATTORNEY

United States Patent Office 3,030,447

Patented Apr. 17, 1962

3,030,447

SPEECH INTERPOLATION SYSTEM

Frederick A. Saal, Plainfield, N.J., assignor to Bell Telephone Laboratories, Incorporated, New York, N.Y., a corporation of New York Filed Jan. 27, 1960, Ser. No. 5,583
14 Claims. (Cl. 179—15)

This invention relates to signal detecting circuits and, more particularly, to the classification of a large number of signal sources into one of a plurality of activity classifications.

In many multiplex signal transmission systems, the operation of the system depends, to a greater or lesser extent, on the condition of activity of a large number of signal sources. One such system, called a Time Assignment Speech Interpolation (TASI) system, increases the capacity of a signal transmission medium by interconnecting a talker and a listener only when the talker is actually engaged in emitting speech. When the talker is not speaking, the transmission channel is made available to other talkers who are currently generating speech signals. One such TASI system is disclosed in the copending application of A. R. Kolding and G. N. Packard, Serial No. 762,779, filed September 23, 1958, since matured into U.S. Patent 2,957,946, issued October 25, 1960.

In a system such as that disclosed by Kolding and Packard, it is clear that means must be provided to detect the activity of each individual signal source in order to control the connections and disconnections of these signal sources to and from the transmission facilities. It has been customary to provide a speech detector for each of these signal sources which makes the activity decision for that particular signal source. To provide a high discrimination against noise and for other advantageous purposes, these speech detectors have assumed a somewhat complex configuration. Good noise discrimination, for example, requires filtering, delayed operation and hangover. Each of these properties adds to the complexity, and hence the cost, of the speech detector. Since the entire speech detector must be duplicated for each signal source, the cost and reliability of this portion of the system are adversely affected as the number of multiplexed signal sources increases.

It is an object of the present invention to reduce the cost and complexity of speech detecting apparatus in a multi-input transmission system.

It is a more specific object of the invention to make the activity decision for each of a plurality of signal sources with common speech detecting apparatus shared on a time division basis.

In accordance with the present invention, signals on each of a plurality of signal lines are recurrently sampled at regular intervals and these samples are recorded in a semipermanent storage medium. Means are provided to store a plurality of successive samples from each signal source and to maintain current the set of samples thus obtained. Common speech detecting circuitry is then presented with the successive sets of samples in successive time slots and makes the necessary decision for each signal source in the prescribed time slot.

The necessary discrimination against noise can be obtained by examining the successive samples for correlation, thus obviating the necessity for expensive band-pass filters. Operate time and hangover can be provided in an obvious manner by requiring a specified number of successive samples to become or remain at prescribed levels.

The major advantage of a common speech detector is the savings in cost and reliability provided by reducing the amount of equipment required. Furthermore, the system may be expanded without significant cost increase provided only that the common equipment can be operated with the required increase in speed.

These and other objects and features, the nature of the present invention and its various advantages, will be more fully understood upon consideration of the attached drawings and of the following detailed description of the drawings.

Figures 1, 1A:
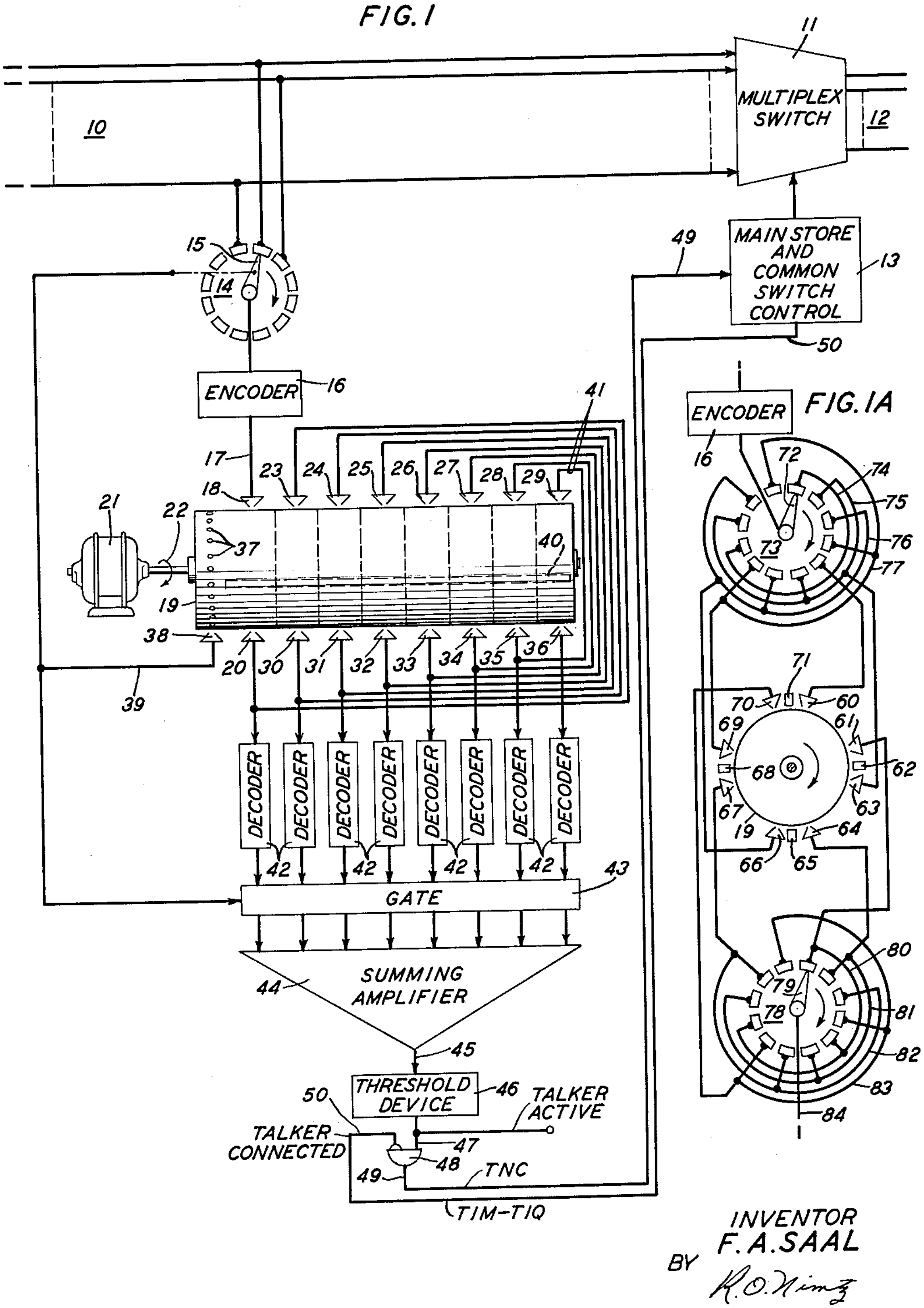
FIG. 1 is a schematic block diagram of a common speech detector circuit for amplitude-line transmission system in accordance with the present invention.
FIG. 1A shows how FIG. 1 may be modified to accommodate a larger number of input lines without increasing the magnetic drum speed.

Referring more particularly to FIG. 1, there is shown a plurality of signal input lines 10 such as might be found, for example, in a Time Assignment Speech Interpolation (TASI) system. The signal input lines are introduced into a multiplexing switch 11 which is arranged to connect any one of input lines 10 to any one of a lesser number of output lines 12. This switching operation is controlled by a common control circuit 13. The details of such a multiplexing switch and control circuit are disclosed in the aforementioned copending application of G. N. Packard and A. R. Kolding.

Each of input signal lines 10 is connected to one segment of a signal sampling commutator 14. Brush 15 of commutator 14 is caused to rotate in a clockwise direction to successively present samples from each of input lines 10 to an encoder circuit 16. While commutator 14 is illustrated in FIG. 1 as a mechanical commutator it is clear that any one of the many known forms of electronic commutators may be used, particularly if the commutating speed required is excessively high.

Signal samples collected by brush 15 are encoded in encoder 16 in a binary code having $n$ digits. For convenience, the output of encoder 16 has been illustrated as appearing on a single lead 17. It is to be understood, however, that the binary codes generated by encoder 16 appear on a plurality of parallel leads. Each of these leads is introduced into a recording head similar to recording head 18 connected to lead 17.

A magnetic drum 19 is provided with an external surface of magnetizable material which is divided into a plurality of circumferential recording bands or "tracks." By means of a recording head, such as head 18, the surface of drum 19 immediately below head 18 can be magnetized in a preselected direction. This sense of magnetization in the spot under recording head 18 can be detected by a reading head similar to reading head 20. A movtive source, such as motor 21, is provided to drive drum 19 at a constant speed in the direction of arrow 22. This motion of drum 19 serves to bring a spot which has been magnetized by writing head 18 under reading head 20 after drum 19 has completed one half of a revolution. Thus, one-half of the circumference of drum 19 serves to store one set of coded samples from line 10. Drum 19 therefore revolves at one-half the speed of commutator 14.

Additional recording heads 23 through 29 are provided to record similar binary codes in different tracks of drum 19. Corresponding reading heads 30 through 36 are provided in each of these tracks to detect the magnetic conditions and thus the binary codes stored therein. An additional timing track consisting of a series of equal spaced permanently magnetized spots 37 is provided along one edge of drum 19. A reading head 38 detects these spots and produces a series of timing pulses on lead 39. These timing pulses are used to drive commutator 14 as shown and to provide all of the other timing required in the common speech detector. A permanently magnetized erasing bar 40 is provided on the reverse side of drum 19 and arranged to remove the condition of magnetization induced by writing heads 18 and 23 through 29.

The outputs derived from reading heads 20 and 30 through 35 are applied through loops 41 to writing heads 23 through 29. That is, signals read from the first track by reading head 20 are applied through one of loops 41 to be recorded in the second track by writing head 23. Signals read from the second track by reading head 30 are similarly applied through writing head 24 to the third track, and so forth. In this way, signals recorded on the first track are moved over one track for each half revolution of drum 19. The last derived codes always appear in the first track and the first derived codes, after being read from the last track by reading head 36, are lost.

Commutator 14 and drum 19 are synchronized by means of timing pulses on lead 39 such that brush 15 makes a complete revolution for each half revolution of drum 19. In this way successive spots in each track are allotted to coded samples picked up from successive ones of input lines 10 by commutator 14. Since there are eight recording heads, after eight revolutions of commutator 14 and four revolutions of drum 19, there are stored on the periphery of drum 19 eight successive coded signal samples from each of input lines 10. These eight successive samples for each input line provide the basis for making speech activity decisions for each of these lines.

To this end a decoder circuit 42 is connected to each of reading heads 20 and 30 through 36. Decoders 42 translate the binary codes read from drum 19 into analog signal values. A sample of each analog voltage thus obtained is derived by a gate 43 under control of timing pulses from lead 39. That is, analog samples from each of the eight decoders 42 are applied by way of gate 43 to a summing amplifier 44. Amplifier 44 is an eight input summing circuit of conventional design which produces at its output 45 an analog signal which is proportional to the sum of its input signals. Since the number of inputs is always fixed, the output on lead 45 is also proportional to the average of the input signals. This average is applied to a threshold device 46, such as a blocking oscillator, which produces a pulse output when, and only when, the voltage output from summing amplifier 44 exceeds a preselected value. The output of threshold device 46 is indicative of the activity status of the particular one of input lines 10 corresponding to the time slot in which the pulse output appears. The output of threshold device 46 will therefore comprise a series of pulse positions synchronized with commutator 14 and drum 19 in which a pulse will be present for each active line and no pulse will be present for each inactive line. Output lead 47 has therefore been termed the talker active lead.

Lead 47 is applied to a gate circuit 48 of a type which will produce an output on lead 49 in the presence of each input on lead 47, provided no input appears on inhibiting lead 50. The signals are provided on lead 50 in the manner described in the aforementioned copending application of Packard and Kolding in time slots corresponding to talkers who have already been indicated as being active and have already been given service by being connected to one of output lines 12. If the input line is just becoming active and has not already received service, no pulse will appear on lead 50 and a pulse will therefore appear on lead 49. Lead 49 has therefore been termed the "Talker Needs Connection" (TNC), lead. Pulses on lead 49 are utilized in the manner taught in the Kolding and Packard application to control multiplex switch 11 so as to connect the active input line to an available one of output lines 12.

The operation of the common speech detector circuit of FIG. 1 can be summarized as follows: signal samples are derived from each of the input lines 10 by commutator 14 and recorded on the first track of drum 19. Signals thus recorded in the first track are re-recorded in the second track after drum 19 has completed one half of a revolution. Signals recorded on track 2 are similarly transferred to track 3, those on track 3 to track 4, and so forth, one such transfer for each half revolution of drum 19. After four revolutions, drum 19 is therefore provided with eight successive samples from each of input lines 10. Moreover, these eight successive samples are the last samples to be taken by commutator 14. The average magnitude of these samples, as determined by summing amplifier 44, is utilized as a measure of whether or not the particular source is active. It is well known, for example, that speech signals have a significantly higher energy content over a given period than do random noise signals of the type generally found on speech transmission paths. By adjusting the threshold of device 46 above the level normally encountered with noise signals, the common speech detector of FIG. 1 will react more readily to speech signals than to noise.

In FIG. 1A there is shown a circuit arrangement by means of which the common speech detector circuit of FIG. 1 may be modified to accommodate a far larger number of input signal lines without increasing the speed of drum 19. Conversely, the same number of signal lines may be accommodated with the modification of FIG. 1A with a substantial reduction in the speed of drum 19.

In FIG. 1A the circumference of drum 19 is divided into four equal sectors or quadrants each of which is utilized as a separate recording medium. Thus, signals recorded by recording head 60 are picked up by reading head 61 and the track cleared by an erasing bar 62. The same track is then used by recording head 63 to record a new code which is read by reading head 64. A second erasing bar 65 again clears the track and another recording head 66 impresses a new code. After this code is picked up by reading head 67 the track is once again cleared by erasing head 68 to allow yet another recording head 69 to impress yet another code on the track which is picked up by reading head 70 and the track cleared by erasing bar 71.

It can be seen that the surface of drum 19 now provides four separate recording tracks for each of the tracks depicted in FIG. 1. Codes generated by encoder 16 are delivered by way of brush 72 of commutator 23 to successive commutator segments. Every fourth one of these segments is connected to recording head 60 by way of bus 74. Every fourth intervening one of the segments of commutator 73 is connected by way of bus 75 to recording head 63, by way of bus 76 to recording head 66, or by way of bus 77 to recording head 69. Commutator 73 therefore serves to deliver a first coded sample to recording head 60, the next sample to head 63, the third sample to head 66, the fourth sample to head 69, and the fifth sample again to recording head 60. This distribution continues so that for each revolution of brush 72 one fourth of all the codes are delivered to each one of recording heads 60, 63, 66 and 69. Drum 19 need therefore be driven at only approximately one fourth of the speed required in the embodiment of FIG. 1. This may be important when a large number of signal sources are involved and it becomes difficult to design and operate a magnetic drum storage system with sufficient speed.

A collecting commutator 78 having a brush 79 is provided to realign the various coded signal samples into their original sequence. Every fourth one of the segments of commutator 78 is connected by way of bus 80 to reading head 61. Intervening ones of the segments of commutator 78 are connected by way of bus 81 to reading head 64, by way of bus 82 to reading head 67, or by way of bus 83 to reading head 70. The output appearing on lead 84 is therefore identical to that which would be obtained with a magnetic drum having only single tracks on each circumference and rotating it about four times the speed required with the configuration of FIG. 1A.

As illustrated in FIG. 1, the output on lead 84 would be applied to a decoder similar to decoder 42 and thence by way of a gate similar to gate 43 to an averaging circuit such as summing amplifier 44. It is to be understood that FIG. 1A illustrates the modification of only one of the tracks in the common speech detector of FIG. 1. A similar arrangement must be provided for each of these tracks, the only difference being that the input signals are derived from a corresponding one of the reading heads 61, 64, 67 or 70 rather than from a commutator such as commutator 73.

The speech detector illustrated in FIG. 1 provides a common means for determining the speech activity status of a plurality of input signal lines with common detecting equipment. The various parameters of this speech detector may be modified by simple modifications in the common circuitry. The operate time of the speech detector, that is, the time delay between the first appearance of speech on one of the input lines and a corresponding active output on lead 47 is, in part, controlled by the threshold level of device 46, the sampling speed of commutator 14, and the fineness of the encoding process in coder 16. If it is desired, however, to provide a minimum operating time, the circuit of FIG. 1 may be modified to require that an output of a preselected level be present in the recording track detected by reading head 36, i.e., the last track on drum 19, before an active output is permitted. A simple threshold gate in lead 45 controlled by the output of the decoder 42 connected to reading head 36 will insure this minimum operate time.

The noise discrimination characteristics of a common speech detector of FIG. 1 are also determined by the speed of sampling commutator 14, the number of digits into which the samples are encoded by coder 16 and the threshold provided by device 46. If samples are taken sufficiently often, it is necessary to provide only a one digit encoder, i.e., a simple threshold device, for encoder 16. This simplifies the system to the extent of requiring only one digit to be recorded in each track on drum 19. Furthermore, decoders 42 then merely comprise pulse regenerators to insure standard amplitude ouput pulses. In this case, summing amplifier 44 comprises a straightforward diode selection matrix in which an output is provided when a preselected portion of the eight inputs, for example, five out of these eight, carried pulses. Threshold detector 46 is not required since the necessary averaging will have been accomplished in the matrix. In view of all of the above simplifications, it becomes desirable to operate the sampling circuits at a sufficiently high rate to allow one digit coding even if this added speed requires a modification in the drum circuit such as that shown in FIG. 1A. The added complexity of the drum input and output circuits would be more than justified by the reduction in complexity in the remainder of the circuit.

Added discrimination against noise can be obtained in this latter embodiment by the simple expedient of requiring that two or more successive samples exceed the threshold value. Such an arrangement is equivalent to examining the samples for correlation. Since speech has much higher a degree of correlation between successive samples than does noise, greater noise discrimination results.

Figure 2:
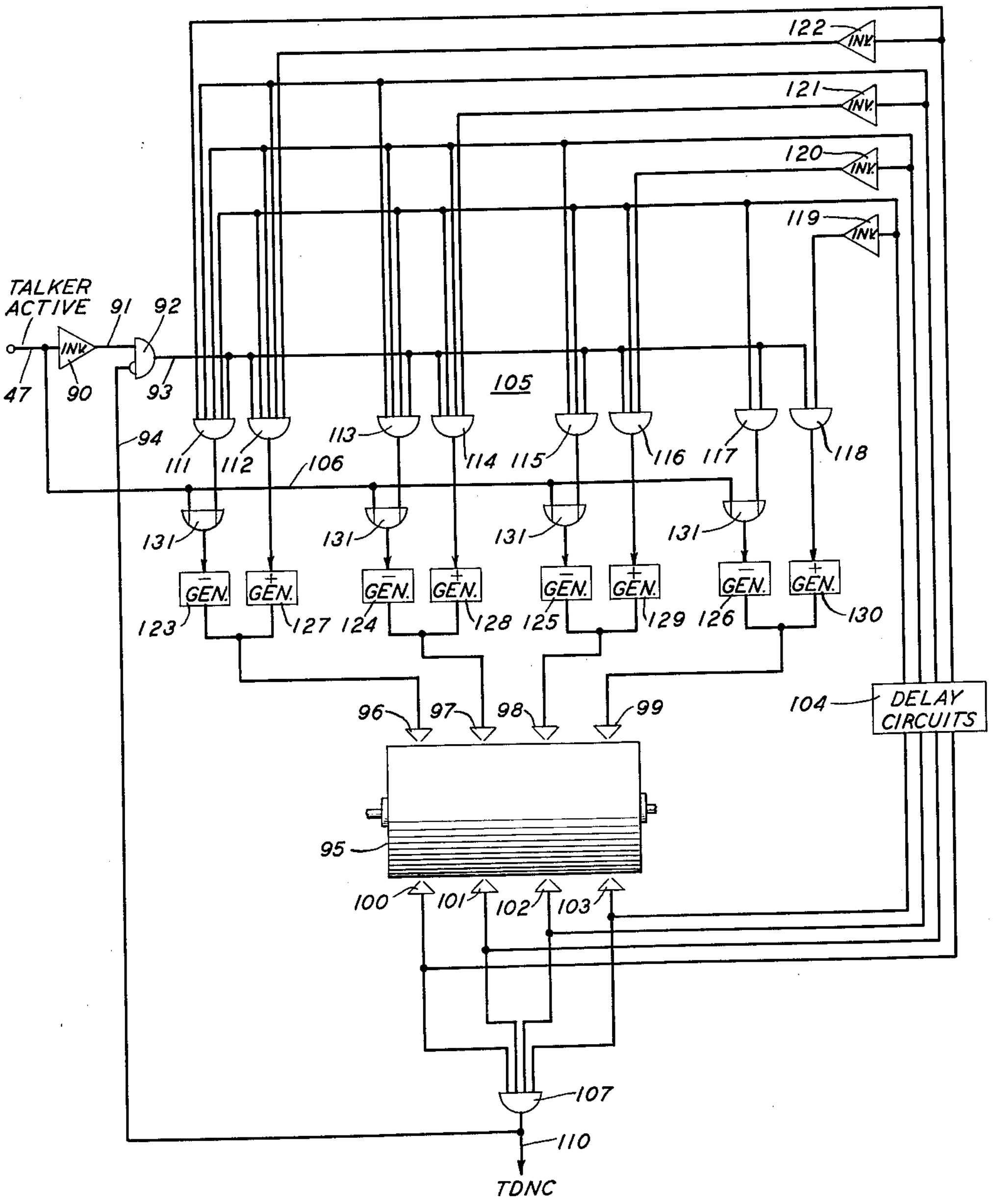
FIG. 2 discloses a time-divided counter for providing hangover for the common speech detector of FIG. 1.

Another important parameter of a speech detector is termed hangover time. Hangover time is the amount of time between the last active indication and the positive indication that the line is no longer active. Hangover is important to prevent the clipping of weak trailing edges of many common speech sounds. In FIG. 2 there is shown one method for providing hangover.

In FIG. 2 there is illustrated a time-divided counting circuit which serves to count successive active indications produced by the common speech detector of FIG. 1. When the number of successive inactive indications reaches a preselected number, a positive indication that the line no longer requires service is provided. To this end, the active indication on output lead 47 of FIG. 1 is applied to an inverter circuit 90 in FIG. 2, to provide on lead 91 an inactive indication. That is, each time an active indication appears on lead 47 no output will appear on lead 91, but when an inactive indication appears on lead 47, i.e., no pulse, a pulse appears on lead 91. These pulses are applied to a gate circuit 92 which provides pulses on advancing lead 93, provided no pulse simultaneously appears on inhibit lead 94.

A magnetic drum 95, which may be mechanically coupled to magnetic drum 19 in FIG. 1 by suitable gearing, or, indeed, may comprise one portion on the same drum, is provided. Drum 95 has four separate recording tracks and four recording heads 96, 97, 98 and 99. Corresponding reading heads 100 through 103 are also provided to detect signals impressed on the various tracks by the writing heads. The outputs from reading heads 100 through 103 are applied through a bank 104 of delay circuits, each having a delay equal to a half revolution of drum 95, to a bank 105 of gate circuits. Gate circuitry 105 performs the necessary logic to provide a counting operation.

Active indications on lead 47 are applied to an erasing lead 106 which serves to reset the count stored on the tracks of drum 95 each time an active indication is received. The counting circuit of FIG. 2 therefore serves to count only successive inactive indications and is reset each time an active indication is received.

An AND gate 107 is provided on the output from reading heads 100 through 103 to detect the condition when each of the digits of the stored code is a one. In the four digit case illustrated in FIG. 2, this would correspond to a count of fifteen. An output on lead 110 therefore indicates that fifteen successive inactive indications have been received with no intervening active indications. The output on lead 110 is therefore indicative that the talker connected to that particular signal line no longer requires service, i.e., "Talker Doesn't Need Connection" (TDNC). The indications on lead 110 are applied by way of lead 94 to the inhibit input of gate 92 to prevent the further application of advance pulses to the logic matrix 105. The count for that particular channel therefore remains "all ones" until the next active indication is received to reset the counter.

The details of the counter input logic circuit 105 are similar to the fast carry binary counter disclosed in the copending application of the present applicant and R. F. Garrison Serial No. 781,755, filed December 19, 1958. That is, the outputs from reading heads 100 through 103 are utilized to preset AND gates 111 through 118 which are then fully enabled by the next succeeding advance pulse on lead 93 to change the digits in the particular tracks to the required values.

Inverters 119 through 122 serve to invert the output digits from reading heads 100 through 103. AND gates 111, 113, 115 and 117 make the decisions as to when the corresponding digits should be changed from a "1" to a "0." The outputs of these gates are therefore applied to a corresponding one of negative signal generators 123 through 126. The outputs of generators 123 through 126 are applied to writing heads 96 through 99, respectively, to induce one condition of magnetic polarization on the periphery of drum 95.

A second plurality of AND gates, gates 112, 114, 116 and 118, make the decisions as to when the corresponding digits should be changed from a "0" to a "1." The outputs of these gates are therefore applied to a corresponding one of positive signal generators 127 through 130. The outputs of the positive signal generators 127 through 130 are also applied to writing heads 96 through 99, respectively. In this case, however, the opposite condition of magnetic polarization is induced on the periphery of drum 95. Reading heads 100 through 103 are arranged to respond only to this opposite condition (representing a binary "1").

It will be noted that there is no erasing bar in the time-divided counting circuit of FIG. 2. The magnetic conditions induced by writing heads 96 through 99 will therefore persist until changed by these writing heads, even though this may not occur until several drum revolutions later. In this way, the surface of drum 95 comprises the storage element for a large number of counting operations.

Application of a pulse to reset lead 106 energizes negative signal generators 123 through 126 through OR gates 131 to set all of the digits to "0." In this way, the count for the particular time slot in which the reset pulse appears is set to zero. It will be remembered that the reset pulse is, in fact, an active pulse from lead 47.

It is to be understood that the above-described arrangements are merely illustrative of numerous and varied other arrangements which may form applications of the principles of the invention. These other arrangements may readily be devised by those skilled in the art without departing from the spirit and scope of the invention.

What is claimed is:

1. In a signal-controlled transmission system, a plurality of signal sources, means for sampling said signal sources in rotation to provide recurrent sequences of signal samples, means for simultaneously storing a plurality of said sequences, means for correlating a plurality of successively stored samples from each signal source to determine signal source activity, and means responsive to said correlating means for generating an activity status signal for each said signal source.

2. The combination according to claim 1 further including means for counting successive inactive status signals for each said signal sources, and means for generating a disconnection controlling signal for each said signal source following a predetermined plurality of successive inactive status signals.

3. A common time-divided speech detector for a plurality of speech signal lines comprising, means for successively determining the signal level on each of said signal lines, time-divided storage means, means for registering in parallel storage channels in said storage means a plurality of successive signal levels for each of said signal lines, means for averaging said successively registered signal levels, and means for generating an active indication each time the average of said successive signal levels exceeds a preselected threshold.

4. The common time-divided speech detector according to claim 3 wherein said time-divided storage means comprises signal level encoding means, a rotating magnetic drum, means for recording encoded signal levels on a first circumferential track on the surface of said drum, a plurality of auxiliary circumferential tracks on the surface of said drum, means for transferring the contents of said first track to one of said auxiliary tracks, means for successively transferring the contents of each of said auxiliary tracks to a succeeding one of said auxiliary tracks, means for detecting the contents of each of said tracks, a plurality of decoding means, and means for applying the detected contents of each of said tracks to one of said decoding means.

5. The common time divided speech detector according to claim 4 wherein each of said circumferential tracks is divided into *n* segments where *n* is any integer greater than one, and means for recording each of *n* successive coded signal levels in a respective one of said segments.

6. In a time assignment speech interpolation system, a plurality of signal sources, means for sampling said sources in rotation to derive, for each said source, a sequence of signal samples, means for encoding each of said signal samples, memory means, means for registering *n* successively coded signal samples for each said source in said memory means, means for reading said *n* successively coded samples for each said source from said memory means, *n* decoding means, means for applying each of said successively coded samples to a respective one of said decoding means, means for correlating the outputs of said decoding means, and means for generating a signal each time said decoder outputs possess a predetermined degree of correlation.

7. The combination according to claim 6 wherein said correlating means comprises a summing amplifier.

8. In combination, a plurality of speech transmission lines, signal level encoding means, means for connecting said lines to said encoding means in rotation, memory means, means for recording the most recent successive outputs of said encoding means for each said lines in said memory means, means for simultaneously decoding said successive outputs for each said lines, means for averaging said simultaneously decoded outputs, means for generating a signal for each time said average falls below a predetermined minimum, means for counting successive ones of said signals, means for generating an inactive indication for each said line when said counting means reaches a preselected count.

9. The combination according to claim 8 further including means for resetting said counting means each time said average exceeds said predetermined minimum.

10. The combination according to claim 8 further including means for blocking the operation of said counting means following the generation of each inactive indication.

11. In a time assignment speech interpolation system, a plurality of talker lines, a lesser plurality of transmission channels, means responsive to the speech activity of said lines for connecting active ones of said lines to available ones of said channels on a time division basis, and common speech detecting apparatus for determining speech activity for all of said lines on a time division basis, said common speech detecting apparatus comprising means for recording successive signal samples from each said line, means for averaging said successive signal samples for each line, means for generating an active indication each time the output of said averaging means exceeds a preselected minimum, means for generating an inactive indication each time the output of said averaging means is less than said preselected minimum, means for counting only successive inactive indications for each said line, and means for generating a control signal for each said line when the count of inactive indications, for that line reaches a preselected number.

12. The combination according to claim 11 wherein said recording means includes a circulating memory having a plurality of recording tracks, each said track being divided into a number of memory slots corresponding to the number of said talker lines, means for writing samples from said lines in corresponding slots of a first one of said tracks, means for transferring recorded samples from each slot of each of said tracks, except the last, to a corresponding slot in the next succeeding one of said tracks, and means for simultaneously reading recorded samples from corresponding slots in each of said tracks.

13. The combination according to claim 12 wherein said recording means comprises the cylindrical surface of a magnetic drum, and means for rotating said drum at a substantially constant speed.

14. The combination according to claim 13 wherein circumferential surfaces of said drum are divided into a plurality of equal segments, and means for independently writing and reading signal samples in each of said segments.

References Cited in the file of this patent

UNITED STATES PATENTS

| | | |
|---|---|---|
| 1,999,872 | Fyler | Apr. 30, 1935 |
| 2,935,569 | Saal | May 3, 1960 |
| 2,961,492 | Carbrey | Nov. 22, 1960 |